US009858280B2

(12) United States Patent
Lee et al.

(10) Patent No.: US 9,858,280 B2
(45) Date of Patent: Jan. 2, 2018

(54) SYSTEM, APPARATUS, PROGRAM AND METHOD FOR DATA AGGREGATION

(71) Applicant: Fujitsu Limited, Kawasaki-shi, Kanagawa (JP)

(72) Inventors: Vivian Lee, Bracknell Bekshire (GB); Bo Hu, Winchester (GB)

(73) Assignee: FUJITSU LIMITED, Kawasaki (JP)

( * ) Notice: Subject to any disclaimer, the term of this patent is extended or adjusted under 35 U.S.C. 154(b) by 325 days.

(21) Appl. No.: 14/524,373

(22) Filed: Oct. 27, 2014

(65) Prior Publication Data
US 2015/0142829 A1    May 21, 2015

(30) Foreign Application Priority Data

Nov. 18, 2013  (EP) .................................... 13193377

(51) Int. Cl.
*G06F 17/30* (2006.01)
*G06F 3/06* (2006.01)

(52) U.S. Cl.
CPC ...... *G06F 17/30091* (2013.01); *G06F 3/0631* (2013.01); *G06F 3/0683* (2013.01); *G06F 17/30412* (2013.01); *G06F 17/30584* (2013.01); *G06F 17/30663* (2013.01); *G06F 3/0607* (2013.01)

(58) Field of Classification Search
CPC ......... G06F 17/30091; G06F 17/30575; G06F 17/30584
USPC ................................................ 707/821, 822
See application file for complete search history.

(56) References Cited

U.S. PATENT DOCUMENTS

| 2005/0022106 A1* | 1/2005 | Kawai | G06F 17/30705 715/233 |
| 2008/0270340 A1* | 10/2008 | Abrams | G06F 17/30563 |
| 2013/0054549 A1 | 2/2013 | Gopalan et al. | |
| 2013/0067483 A1 | 3/2013 | Archer et al. | |
| 2015/0052125 A1* | 2/2015 | Ellis | G06F 17/30572 707/724 |

FOREIGN PATENT DOCUMENTS

CN        102231141 A    11/2011

OTHER PUBLICATIONS

Furtado Pedro: "A Survey of Parallel and Distributed Data Warehouses", International Journal of Data Warehousing and Mining (IJDWM), Apr. 2009 (Apr. 2009), pp. 57-77.

(Continued)

*Primary Examiner* — Thu-Nguyet Le
(74) *Attorney, Agent, or Firm* — Staas & Halsey LLP (57) ABSTRACT

Embodiments include a method, apparatus, program, and system for distributing data items among a plurality of data storage units, the data items being an aggregation of data from a plurality of data sources. The method comprises generating a semantic description of each of the plurality of data sources; calculating, for each pair of data sources from among the plurality of data sources, a degree of similarity between the semantic descriptions of the pair of data sources; and allocating data items to data storage units in dependence upon the calculated degree of similarity between the data source of a data item being allocated and the or each data source of data items already allocated to the data storage units.

8 Claims, 4 Drawing Sheets

(56) References Cited

OTHER PUBLICATIONS

Ramez Elmasri; Shamkant B Navathe (eds), "Chapter 25: Distributed Databases ED" G86 F17/38 2811 Fundamentals of Database Systems (Sixth Edition), Addison-Wesley, pp. 877-927.
International Search Report dated May 14, 2014 in corresponding European application 13193377.2

\* cited by examiner

SYSTEM, APPARATUS, PROGRAM AND METHOD FOR DATA AGGREGATION

CROSS REFERENCE TO RELATED APPLICATIONS

This application claims the benefit of European Application No. 13193377.2, filed Nov. 18, 2013, the disclosure of which is incorporated herein by reference.

BACKGROUND OF THE INVENTION

1. Field of the Invention

This invention lies in the field of applications in the semantic web, and in particular relates to aggregation of data from different heterogeneous data sources into a database which provides a unified view of the data.

2. Description of the Related Art

In the current Big Data era, data aggregation plays a vital role in data analytics. It helps Big Data analytics tools to gather data from heterogeneous sources in a variety of formats, and to consolidate those data into one unified view. Data aggregation includes a number of connected sub-processes. For example, data aggregation may include reading data from external data sources, from which the data format can span from structured, through semi-structured, to unstructured data. Data aggregation may further include processing the data including data format conversion into a unified data type. For example, RDF data types provide a flexible data structure in Big Data applications. Finally, data aggregation methods may include writing the formatted data into data storage.

Currently, available technologies for writing data include random allocation of data items to data storage units, and/or reallocating data after the data have been written into the storage. Random write is simple to implement but the resulting spread of data items is not conducive to efficient handling of database queries. Adaptive locator technology does improve query performance, but relies upon reallocation triggered by data usage.

Embodiments include a method for distributing data items among a plurality of data storage units, the data items being an aggregation of data from a plurality of data sources, the method comprising: generating a semantic description of each of the plurality of data sources; calculating, for each pair of data sources from among the plurality of data sources, a degree of similarity between the semantic descriptions of the pair of data sources; and allocating data items to data storage units in dependence upon the calculated degree of similarity between the data source of a data item being allocated and the or each data source of data items already allocated to the data storage units.

Data aggregation plays an important role in Big Data analytics. In order to construct a more comprehensive view of all available data for end users and applications, data aggregation is a process including gathering external data from disparate sources and storing them as data items (for example, as a virtual database) that provide users a unified view. However, if data locality is not considered when writing data items initially into data storage, the query response time can become a performance bottleneck and prohibit access to the stored data items, particularly if the database is growing at a fast speed. Embodiments of the present invention provide a mechanism for improving the allocations of external data and existing data to data storage units, so that cross-storage unit graph traversals can be minimised and queries can be efficiently evaluated across the entire data space, even when new data are included in the aggregated data set.

SUMMARY OF THE INVENTION

Advantageously, embodiments of the present invention provide a mechanism for improving the efficiency of database queries (the database being the data items stored in the data storage units). Allocating data items to data storage units in dependence upon the similarity between the data sources provides a basis for grouping data items which have some likelihood of being queried together on the same data storage unit, thus reducing graph traversals across data storage unit boundaries, and hence improving efficiency of query handling. Furthermore, embodiments do not rely upon data access history of data items to assess the likelihood of data items being queried together, so the method is applicable to data items being newly added to a database.

A data source may be one or any combination of the following: a particular URL or group of URLs (i.e. a data source may be specified by a prefix or prefixes, and all URLs including the prefix or prefixes are deemed included in the data source), a document, a document corpus, a data storage location or address (or group thereof), or some other form of readable encoded information. Where data or a data item is referred to as being from a data source, it may be taken to mean that the data or data item encodes information read from the data source. Data sources may be external data sources, indicating the origin of the data is outside of the database or data storage system of an embodiment. The data items allocated to and stored among the plurality of data storage units may be referred to as the database or the aggregated database.

The data items are an encoded form of knowledge about a domain, and include knowledge about the domain from more than one data source. Data items may be allocated and written to data storage units on a data source by data source basis, so that data items from the same data source are allocated and written to the data storage units adjacent to one another chronologically. Data items may be allocated and written to data storage units in groups, wherein each group represents the data items from a different individual data source. For example, the data items may be new data items being written into the data storage units for the first time. The data items stored in the data storage units form a database. The data items to be allocated may be data items which are new to the database, and hence the data storage unit to which they are allocated is their initial data storage unit location.

The allocating may be performed for new data items prior to (or as part of the process of) their initial writing to one of the data storage units.

The generating, calculating, and allocating are not necessarily performed in a fixed order or each performed each time a data item is allocated to a data storage unit. For example, it may be that the generating and calculating are performed each time a data item from a new data source is to be allocated, whereas when a data item is to be allocated from a data source from which data items have already been allocated or are already stored in the data storage units, the semantic description has already been generated and the degrees of similarity already calculated, so there is no requirement to repeat those steps. A data source may be considered to be a new data source if no data items from the data source are already allocated to or stored in the data storage units.

Methods may further comprise maintaining a register of, for each data source, information including the data source identity and semantic description. The information may further include source URL, title, and data type. The register may be a metadata registry. Alternatively or additionally, and either as part of the register/metadata registry or otherwise, methods may comprise maintaining a record of the calculated degrees of similarity. For example, the record may be in the form of a square matrix with each data source corresponding to a row and column so that each entry in the matrix corresponds to the degree of similarity between the data source corresponding to the row of the entry and the data source corresponding to the column of the entry (which may not necessarily be different data sources).

The data items may be in a format which includes an identifier of the respective data source embedded in the data item. The identifier is sufficient to identify the data source from among the plurality of data sources. The identifier may be included as metadata or be in some other way derivable from the data in a data item.

The plurality of data storage units are interconnected at least insofar as they may all be communicated with from a single access point such as an entry server or entry node. However, the data storage units are distinct insofar as they have distinct management units so that they must be queried separately in order to locate a data item. The data storage units may each be distinct storage servers, or may be distinct storage units within one or more servers, accessible via separate management units. Each data storage unit is operable to store a portion of the plurality of data items. A data storage unit may be a disk such as a hard disk.

Methods may further comprise writing data items to the data storage units to which they have been allocated. Data items may be written immediately following allocation, or it may be that allocation of a group or number of data items is performed, and then the data items are written collectively.

Optionally, generating a semantic description of each of the data sources includes extracting the most significant terms as a list of weighted terms from the data source which list of weighted terms is the generated semantic description.

Extracting the most significant terms (a term being a word or phrase) may include: calculating a numerical score representing the significance of terms in the data source; and compiling a list or vector of terms including each of the most significant terms identified in the textual description in association with their respective numerical scores. The associated numerical scores represent the weighting of the respective terms.

Advantageously, a vector or list represents a format for storing and assessing the semantic descriptions which allows for ease of storage and fast and accurate degree of similarity calculation. For example, vectors can be assessed against one another geometrically. Embodiments may compare two vectors of terms using a cosine comparison. An exemplary procedure for comparing such vectors is latent semantic analysis, which leverages a cosine comparison Embodiments may include scoring each of the extracted most significant terms numerically, or using some other metric, in order to quantify the relevance of each term in the vector or list to the semantic description of the data source. The quantifying of the significance of the terms enables the terms to be weighted, so that the extent of their similarity to terms from the vector or list of another semantic description against which they are being compared for degree of similarity calculations will carry more or less importance to an overall assessment of the degree of similarity between the two concepts in dependence upon the combined weights of the two terms being assessed.

Optionally, the most significant terms among terms in the data source are identified by an information retrieval technique. For example, the most significant terms may be identified by, and the weight attributed to each of the extracted most significant terms be calculated by, a term-frequency method.

Term-frequency methods are computationally inexpensive techniques for assessing the significance of a term within a document or data source. Embodiments may include some pre-processing, such as natural language processing. The natural language processing may include tokenisation and stemming.

As an optional implementation of the numerical scoring of terms, the numerical score may be based on a term frequency-inverse document frequency assessment, wherein the significance of the term is assessed by measuring the frequency of its usage in the data source relative to the frequency of its usage in a larger document corpus such as the plurality of data sources collectively.

Term frequency-inverse document frequency provides a simple to implement and efficient to process technique for calculating the significance of terms.

Once compiled, the semantic descriptions may be compared by a comparison such as a geometrical comparison.

Advantageously, a geometrical comparison of two semantic descriptions provides a computationally efficient way of assessing the degree of similarity between two data sources. The geometrical comparison of a pair of semantic descriptions may comprise a comparison of each term in one semantic description with each term in the other semantic description, which comparisons generate a score quantifying the similarity between the two terms, possibly weighted according to the significance weighting of the two terms in their respective semantic descriptions. An overall assessment of the similarity between the two semantic descriptions can then be calculated, for example, by summing, averaging, weight-averaging, or some other process for combining the results of the individual term comparisons.

In particular implementations, term-frequency may be employed as a method for identifying and attributing weightings to the most significant terms in a data source, which most significant terms form the semantic description. Simple term-frequency is a suitable method in implementations in which, for example, external data sources are incorporated individually thus multi-document summarisation techniques are invalid. In addition, external data sources can be potentially very large, and more complex summarisation techniques (such as those techniques which require multiple rounds of scanning) might have a negative impact on the overall system performance. In invention embodiments, semantic description generation may be performed whilst the data is read from the external data source and converted to the unified format of the aggregated database. It, therefore, does not result in significant deterioration of the system performance. The similarity calculation cost will increase when more external data sources enter the system, however, the increase is linear, and the calculation complexity stays the same, therefore, the cost increase is not out of step with the data conversion process, and bottlenecks are avoided.

The degree of similarity may be a value obtained by calculating the cosine similarity between the generated semantic descriptions of the pair of data sources. A cosine similarity, which generates a score between 0 and 1 for each term comparison, 0 being completely different and 1 being the same, is an example of a geometrical comparison forming part of invention embodiments.

Optionally, allocating data items to data storage units in dependence upon the calculated degree of similarity includes allocating a data item to be allocated to the data storage unit storing the highest proportion of the data items from the data source having the highest degree of similarity to the data source of the data item to be allocated.

Advantageously, the degree of similarity calculations can be utilised in a simple manner to identify the most similar data source to the data source of the item to be allocated. Since it may be logically assumed that data items from semantically similar data sources are likely to be accessed or queried in the same graph operations (for example, graph traversals), the number of graph traversals which cross data storage unit boundaries can be reduced by storing data items from semantically similar data sources on the same data storage units.

In a situation whereby a data item is added to the database from a data source from which data items already exist in the database, the data item may be added to a data storage unit storing data items from the same data source as a default storage location. Periodically or after a predetermined number of data items from the data source have been added, the semantic description of the data source may be re-generated and similarity calculations updated accordingly.

Allocating data items to data storage units in dependence upon the calculated degree of similarity may include allocating a group of data items from the same data source to the data storage unit storing the highest proportion of the data items from the data source having the highest degree of similarity to the data source of the data item to be allocated which has sufficient storage space for the group of data items.

In order to preserve groupings between data items from the same data source, it may be that when a new data source (or more accurately, data items from a new data source) is added to the database, some or all of the data items from the same data source are allocated together. Storage space may become a consideration in selecting a data storage unit to which to allocate the group of data items. Embodiments such as that described above provide a mechanism for co-locating data items from the same data source, whilst also optimising the similarity between data sources whose data items are stored on the same data storage unit, and taking into account storage space considerations.

Embodiments may further comprise maintaining a record of, for each data source, the identity of the or each data storage unit storing one or more data items from the data source and an indication of the proportion of the data items from the data source stored on the or each identified data storage unit.

Maintaining such a record provides information which can be utilised or leveraged in order to identify where data items from particular data sources are located (in terms of identity of data storage unit). Re-allocation of existing data items may also be performed based upon information stored in such a record. The indication of the proportion may be expressed as a fraction, percentage, decimal, or absolute number of data items (from which a proportion can be derived based on other entries in the record for the same data source).

Embodiments may utilise a unified data format in which to store data items. Advantageously, aggregating data from a plurality of data sources, which are often distinct from one another not only in terms of physical location but in terms of data format, affords an opportunity to re-write the data in a form which is efficient to query and easy to manage. In order to achieve such benefits, a unified data format is beneficial. The data sources may comprise data in any format, and those data may be read and converted into the unified data format prior to the generation of the semantic description, or at some other stage in a method embodying the present invention. A data format may be considered to be unified insofar as the significance or type of data appearing at particular positions or identified by particular tags or other identifiers is common across all of the data items.

In order to utilise a unified data format, embodiments may further comprise reading data from a data source and performing processing to prepare the read data for storage as data items having the unified data format.

Data sources may store data in a format which is the same as the unified data format of the plurality of data items. However, in some cases it may be that the format of data in a data source is different from that of the unified data format, and hence some additional processing is required in order to prepare the data from the data source for storage as data items having the unified data format. Such processing may also be beneficial insofar as it results in the data from the data source being in a format suitable for the generating and calculating steps of the method.

An exemplary unified data format is an RDF triple format. Advantageously, RDF (Resource Description Framework) data types such as RDF triples provide a flexible data structure which provides meaningful links between resources and hence can be readily interpreted. RDF provides a framework for marking up data items in a semantically meaningful manner.

Relational databases store data in rows and columns. The rows and columns compose tables that need to be defined before storing the data. The definition of the tables and the relationship between data contained on these tables is called a schema. A relational database uses a fixed schema. Graph databases represent a significant extension over relational databases by storing data in the form of nodes and arcs, where a node represents an entity or instance, and an arc represents a relationship of some type between any two nodes. In an undirected graph, an arc from node A to node B is considered to be the same as an arc from node B to node A. In a directed graph, the two directions are treated as distinct arcs.

Graph databases are used in a wide variety of different applications that can be generally categorized into two major types. The first type consists of complex knowledge-based systems that have large collections of class descriptions (referred to as "knowledge-based applications"), such as intelligent decision support and self learning. The second type includes applications that involve performing graph searches over transactional data (referred to as "transactional data applications"), such as social data and business intelligence. Many applications may represent both types. However, most applications can be characterized primarily as either knowledge-based or transactional data applications. Graph databases can be used to maintain large "semantic networks" that can store large amounts of structured and unstructured data in various fields. A semantic network is used as a form of knowledge representation and is a directed graph consisting of nodes that represent concepts, and arcs that represent semantic relationships between the concepts.

There are several types of graph representations. Graph data may be stored in memory as multidimensional arrays, or as symbols linked to other symbols. Another form of graph representation is the use of "tuples," which are finite sequences or ordered lists of objects, each of a specified type. A tuple containing n objects is known as an "n-tuple," where n can be any non-negative integer greater than zero. A tuple of length 2 (a 2-tuple) is commonly called a pair, a 3-tuple is called a triple, a four-tuple is called a quadruple, and so on.

The Resource Description Framework (RDF) is a general method for conceptual description or modelling of information that is a standard for semantic networks. In order to be able to store and search large amounts of data, the data must be maintained in multiple servers. Adding, deleting and querying data must be done in a coordinated way, using algorithms and data structures specially tailored for distributed systems. It is desirable to store graph data in a way which enables computationally efficient querying, maintenance, and manipulation of the data.

Optionally, the triples may be Resource Description Framework (RDF) triples. Throughout this document, it should be understood that where specific references to "RDF triple(s)" are made, it is an exemplary form of triple, conforming to the RDF standard. Furthermore, references to "triple(s)" include the possibility that the triple in question is an RDF triple. Similarly, the RDF processors discussed elsewhere in this document are exemplary of processors used for interaction between the API wrapper and the stored data items.

The Resource Description Framework is a general method for conceptual description or modelling of information that is a standard for semantic networks. Standardising the modelling of information in a semantic network allows for interoperability between applications operating on a common semantic network. RDF maintains a vocabulary with unambiguous formal semantics, by providing the RDF Schema (RDFS) as a language for describing vocabularies in RDF.

The triples provide for encoding of graph data by characterising the graph data as a plurality of subject-predicate-object expressions. In that context, the subject and object are graph nodes of the graph data, and as such are entities, objects, instances, or concepts, and the predicate is a representation of a relationship between the subject and the object. The predicate asserts something about the subject by providing a specified type of link to the object. For example, the subject may denote a Web resource (for example, via a URI), the predicate denote a particular trait, characteristic, or aspect of the resource, and the object denote an instance of that trait, characteristic, or aspect. In other words, a collection of triple statements intrinsically represents directional graph data. The RDF standard provides formalised structure for such triples.

Optionally, each of one or more of the elements of the triple (an element being the predicate, the object, or the subject) is a Uniform Resource Identifier (URI). RDF and other triple formats are premised on the notion of identifying things (i.e. objects, resources or instances) using Web identifiers such as URIs and describing those identified 'things' in terms of simple properties and property values. In terms of the triple, the subject may be a URI identifying a web resource describing an entity, the predicate may be a URI identifying a type of property (for example, colour), and the object may be a URI specifying the particular instance of that type of property that is attributed to the entity in question, in its web resource incarnation. The use of URIs enables triples to represent simple statements, concerning resources, as a graph of nodes and arcs representing the resources, as well as their respective properties and values. An RDF graph can be queried using the SPARQL Protocol and RDF Query Language (SPARQL). It was standardized by the RDF Data Access Working Group (DAWG) of the World Wide Web Consortium, and is considered a key semantic web technology. SPARQL allows for a query to consist of triple patterns, conjunctions, disjunctions, and optional patterns.

In embodiments, it may be that stored data is effectively dislodged by the arrival of new data, for example, data from an external data source not previously represented in the database. Optionally, if a data storage unit selected to receive data items being allocated already stores data items from two data sources, and the degree of similarity between the semantic descriptions of the two data sources is less than the higher of the degrees of similarity between the semantic descriptions of each of the data sources and the data source of the data items to be allocated, then the data items from the one of the two data sources having the lowest degree of similarity to the data source of the data items to be allocated are removed from the data storage unit and allocated elsewhere.

Furthermore, if the degree of similarity the semantic descriptions of the two data sources is not less than the higher of the degrees of similarity between the semantic descriptions of each of the data sources and the data source of the data items to be allocated, then a different data storage unit is selected to receive the data items being allocated.

Advantageously, reallocating data items in this way may increase the overall degree of similarity between the data sources of co-located data items.

Data items may include elements stored in a way which enables the data source of the data item to be identified. For example, the data items may each include an identifier identifying the data source of the respective data item from among the plurality of data sources.

Advantageously, identifying the data source of an item enables the location (in terms of data storage units) of data items from different data sources to be tracked or ascertained. Statistics can then be generated which enable decisions to be made, such as the allocation of new data items or re-allocation of existing data items. The identifier may be a piece of metadata, or may be derivable in some other way from the content of the data item.

Embodiments of another aspect of the present invention include: an apparatus for distributing data items among a plurality of data storage units, the data items being an aggregation of data from a plurality of data sources, the apparatus comprising: a description generating module configured to generate a semantic description of each of the plurality of data sources; a similarity calculation module configured to calculate, for each pair of data sources from among the plurality of data sources, a degree of similarity between the semantic descriptions of the pair of data sources; and an allocator, configured to allocate data items to data storage units in dependence upon the calculated degree of similarity between the data source of a data item being allocated and the or each data source of data items already allocated to the data storage units.

Embodiments of another aspect of the present invention include a computer program which, when executed by a computing apparatus, causes the computing apparatus to perform a method embodying the present invention.

Embodiments of a further aspect of the present invention include a computer program or suite of computer programs which, when executed by one or more computing apparatuses, causes the one or more computing apparatuses to function as an apparatus embodying the present invention and/or as a data storage system embodying the present invention.

Such a computing apparatus may be, for example, a server. In addition to storage functionality the computing apparatus is configured to perform processing operations and to communicate with other data storage units in a distributed network of data storage units and/or with a centralised controller.

Embodiments may be provided in the form of a system comprising an apparatus for distributing data items among a plurality of data storage units which apparatus embodies the invention, and the system also includes the plurality of data storage units. The data storage units may each be computing resources, for example, they may each include a storage unit, in addition to a processor, memory, and/or additional components such as a network interface card, a motherboard, input/output devices.

Furthermore, invention embodiments may include a suite of computer programs which, when executed by a distributed network of computing apparatuses, cause the distributed network of computing apparatuses to function as a system embodying the invention.

Furthermore, embodiments of the present invention include a computer program or suite of computer programs, which, when executed by a system of computing apparatuses including a distributed network of storage units cause the system to perform a method embodying the present invention.

Although the aspects (software/methods/apparatuses) are discussed separately, it should be understood that features and consequences thereof discussed in relation to one aspect are equally applicable to the other aspects. Therefore, where a method feature is discussed, it is taken for granted that the apparatus embodiments include a unit or apparatus configured to perform that feature or provide appropriate functionality, and that programs are configured to cause a computing apparatus on which they are being executed to perform said method feature.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

Embodiments of the present invention provide a method, system, apparatus, and software which utilise a semantic description as a basis for which algorithms or other distribution mechanisms to allocate data items both initially and as part of a data reallocation procedure.

BRIEF DESCRIPTION OF THE DRAWINGS

Specific embodiments of the invention will be discussed in more detail below, with reference to the accompanying drawings, in which.

DETAILED DESCRIPTION OF THE PREFERRED EMBODIMENTS

Figure 1:
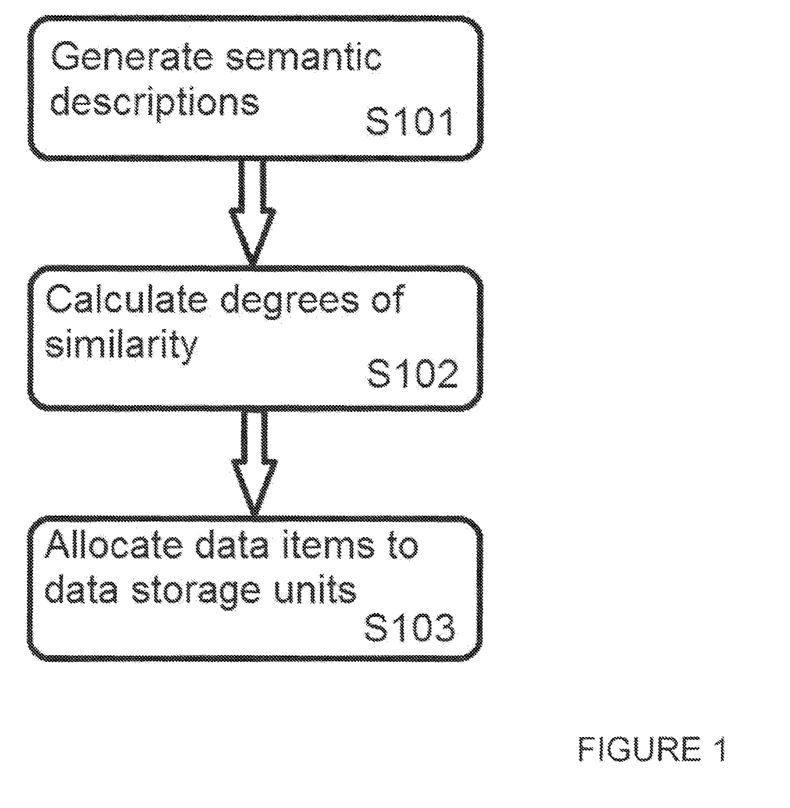
FIG. 1 illustrates a flow of processes embodying the present invention.

FIG. 1 illustrates a series of processes embodying the present invention. The order in which the processes are presented represents the dependency of subsequent steps on the output of previous steps. However, outputs may be re-used in plural iterations of subsequent steps, so that, for example, it is not necessary to generate semantic descriptions and calculate degrees of similarity each time data items are to be allocated to data storage units. In the below description, the term database is used to refer to the plurality of data items stored among the data storage units.

The individual processes illustrated in FIG. 1 form a method embodying the present invention. The method may be computer-implemented, implemented on specialist hardware, or implemented in some other way. If the method is computer-implemented, it may be implemented by a single computer (which may also be referred to as a node or a server) or by plural interconnected or networked computers operating cooperatively. For example, it may be that the different individual process S101-S103 are performed by separate computers. A computer implementing the method of claim 1 may be a head server, head node, entry server, entry node, or some other computer having a control function in a database or data storage system.

The processes S101-S103 illustrated in FIG. 1 form a method embodying the present invention. They may be interspersed or combined with other processes to form further methods embodying the invention.

The individual processes S101-S103 are not necessarily performed serially and may be performed chronologically overlapping or concurrently. For example, it may be that existing semantic descriptions can be partially utilised in calculating degrees of similarity S102 while generating semantic descriptions S101 of one or more new data sources. The database may be compiled on a data source by data source basis, so that all data items from a first data source are prepared and written to the database, and then a next data source, and so on. A semantic description of the first data source is generated for comparison purposes, but it is not possible to calculate degrees of similarity S102 until there are data items from a second data source ready to be written to the database. The data items from the first data source may be written to a randomly allocated data storage unit and may be grouped together on a single data storage unit or on as few data storage units as possible.

At step S101 a semantic description is generated of each of the plurality of data sources from which data is aggregated in the database. Step S101 may be performed by a description generating module which may be a functional module of a computer program, and hence comprise computer hardware executing instructions based on an input (read data from the data source) in order to generate an output (the semantic description of the data source). Alternatively, the description generating module may be a dedicated piece of hardware. Each time data items from a new data source are to be added to the database, a semantic description of the data source is generated. A semantic description is a summary of the meaning of the content of the data source. Semantic descriptions, once generated, may be updated, for example, when triggered by an event such as a new data item from the data source being read for addition to the database, or at system idle time. Once generated a semantic description may be stored along with an identifier of the respective data source.

The framework or structure of semantic descriptions is implementation-dependent. Exemplary forms include a list or vector of most significant terms in the data source each associated with a quantitative representation of the significance of the term. It may be that a fixed number of terms is included in the semantic description of each data source, which fixed number is predetermined and constant for all data sources whose data items are included in the database.

The processing steps included in the overall process of generating semantic descriptions S101 is implementation-dependent. Exemplary steps include one or more of: reading the data source or reading information included in the data source; performing pre-processing on the read data or information to structure the data or information in a format suitable for analysis; removing common words with no semantic significance; and analysing the read data or information to identify the most significant terms, for example, by a frequency-based analysis method.

At step S102 the degree of similarity between the pair of data sources from which data items to be written to the database is calculated. In implementations in which there are more than two data sources, the degrees of similarity of at least one, and possibly all, pairs from among the more than two data sources. Step S102 may be performed each time data items from a new data source are to be added to the database (calculating the degree of similarity between the new data source and one or more existing data source), and in that sense the degrees of similarity are built up over time along with the database.

Calculating the degrees of similarity S102 comprises calculating, for each pair of data sources from among the plurality of data sources being considered, a degree of similarity between the semantic descriptions of the pair of data sources. The plurality of data sources being considered may be every data source from which data items are aggregated in the database, or may be a subset of those data sources, for example, those data sources which are in a format suitable to having a semantic description generated.

Calculating the degree of similarity between a pair of data sources is performed by comparing the semantic descriptions of the pair. Therefore, calculating the degree of similarity between a pair of data sources is equivalent to calculating the degree of similarity between the semantic descriptions of a pair of data sources.

Step S102 may be performed by a similarity calculation module which may be a functional module of a computer program, and hence comprise computer hardware executing instructions based on an input (semantic descriptions of the pair of data sources) in order to generate an output (a quantification such as a value representing the degree of similarity between the pair). The degree of similarity may be represented in embodiments by data such as a value, which may take any of a number of discrete values between an upper and lower limit, for example, between 0 and 1. The number of possible discrete values (i.e. the precision) of the value will depend upon the implementation details, but, for example, the value may be rounded to a single decimal place.

Calculating the degree of similarity between a pair of semantic descriptions may be based upon identifying which terms in the semantic description of one of the pair also appear in the semantic description of the other of the pair, and increasing the degree of similarity for the pair by an amount each time such a term is identified. For example, the amount of increase may be proportional to the product of the respective weightings (the numerical value representing the significance of the term in the semantic description) associated with the term in the respective semantic descriptions. It may be that the semantic descriptions are extended to include synonyms and/or polynyms of the terms, so that the degree of similarity is increased when both semantic descriptions contain one from a list including a term and one or more synonyms or polynyms of the term.

Once the degree of similarity of one or more pairs of data sources has been calculated, the degree of similarity is stored, or more specifically, a value representing the degree of similarity is stored. The degree of similarity between a pair of data sources is stored in such a way that it can be attributed to the particular pair of data sources for which it was calculated. For example, a square matrix may be compiled in which a column and row is included for each data source, so that each entry in the matrix corresponds to a pair of data sources, and the entry is the degree of similarity between said pair (or a representative value).

At process S103 data items are allocated to data storage units. Step S103 may be performed by an allocator module which may be a functional module of a computer program, and hence comprise computer hardware executing instructions based on an input (one or more data items to be allocated and calculated degrees of similarity between the data source of the one or more data items and the data sources of data items already stored in the data storage units) in order to generate an output (a selection of a data storage unit upon which to store the one or more data items). The allocator module may also be configured to write the one or more data items to the selected data storage unit. Alternatively, the allocator module may notify a data item write module of the data storage unit to which each data item is allocated, and the data write unit then performs the data write operation of the data item to the data storage unit.

Allocating data items to data storage units S103 comprises allocating data items to data storage units in dependence upon the calculated degree of similarity between the data source of a data item being allocated and the or each data source of data items already allocated to the data storage units. The specific algorithm used to select to which data storage unit to allocate a data item is implementation-dependent. The degree of similarity between the data source of a data item being allocated and data items already stored on the data storage units determines an order of preference in which data storage units are considered as allocation targets. The algorithm may simply find the data storage unit or data storage units storing data items from the data source most similar to the data source of the data items being allocated. Alternatively, some form of aggregation or integration may be employed to score each data storage unit on how similar on average the data source(s) of the data items stored thereon are to the data source of the data item(s) being allocated, and the data storage having the highest average and sufficient storage space for the data item or data items be selected. It may be that once the order of preference is determined, additional factors such as available storage space or the proportion of the data items from the pertinent data source are also considered either as discriminating factors or to break ties. For example, it may be that the data source most similar to the data source of the data item to be allocated is identified from the stored degrees of similarity, and the data item is allocated to a data storage unit storing data items from the identified data source. For example, to the data storage unit storing the most data items from the identified data source. It may be that data items are preferentially allocated to data storage units storing data items from their respective data sources, but when there are none in the database from the data source, or when there is no storage space, then the data items are allocated to the data storage unit storing data items from the most similar data source.

Optionally, data items are allocated in groups. For example, it may be that a set of data items from a common data source are prepared for allocation, for example, the data source may be one from which there are no data items currently in the database. The set of data items are preferentially allocated to the data storage unit storing the largest proportion of the data items from the most similar data source to the common data source of the set of data items. It may be that a prerequisite or allocation rule is that the set is not split over more than one data storage unit, so that if such a set cannot be stored on the data storage unit storing the largest proportion of the data items from the most similar data source, that they are allocated to the data storage unit storing the highest proportion of data items from the most similar data source having sufficient space to store the entire set.

Figure 2:
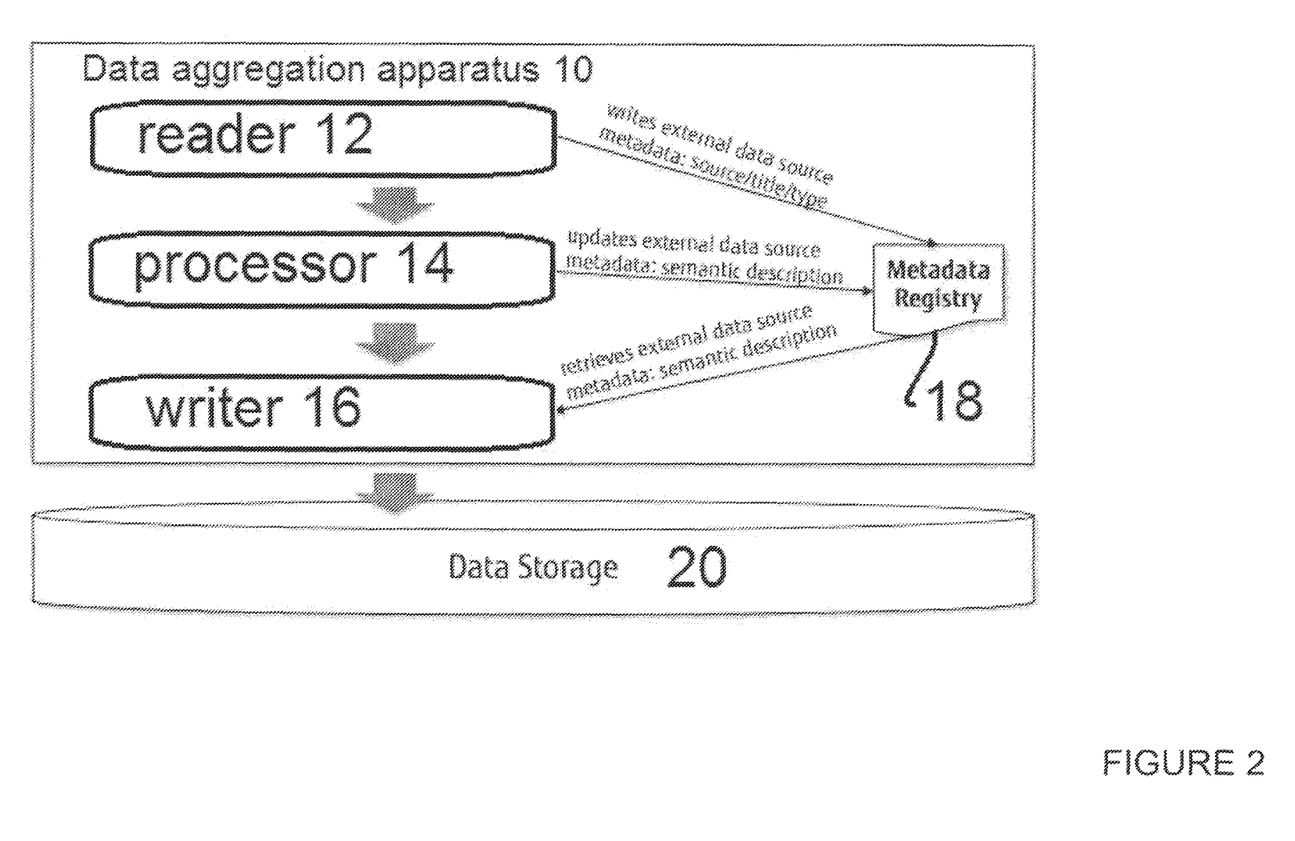
FIG. 2 illustrates an exemplary architecture of a data aggregation apparatus embodying the present invention.

FIG. 2 illustrates an exemplary architecture of a data aggregation apparatus 10. In the discussion of this and other examples and embodiments, RDF triples are used as an exemplary form of data item. Embodiments may be applied to other forms of data item, and the RDF triple example is one of many possible data item formats. Data sources may be referred to as external data sources, which indicates that the data sources are external to the plurality of data storage units among which the data items are being allocated.

The data aggregation apparatus 10 illustrated in FIG. 2 comprises the following components: a reader 12, a processor 14, a writer 16, and a metadata registry 18. The components may be realised as specialised hardware components or as modules forming part of a program, or as processes in a method which may be computer-implemented. The data aggregation apparatus 10 is operable to communicate with a data storage 20, which data storage is illustrated as a single component as a representation of the unified view of the aggregated data. However, the hardware providing the data storage 20 is a plurality of individual data storage units.

Figure 3:
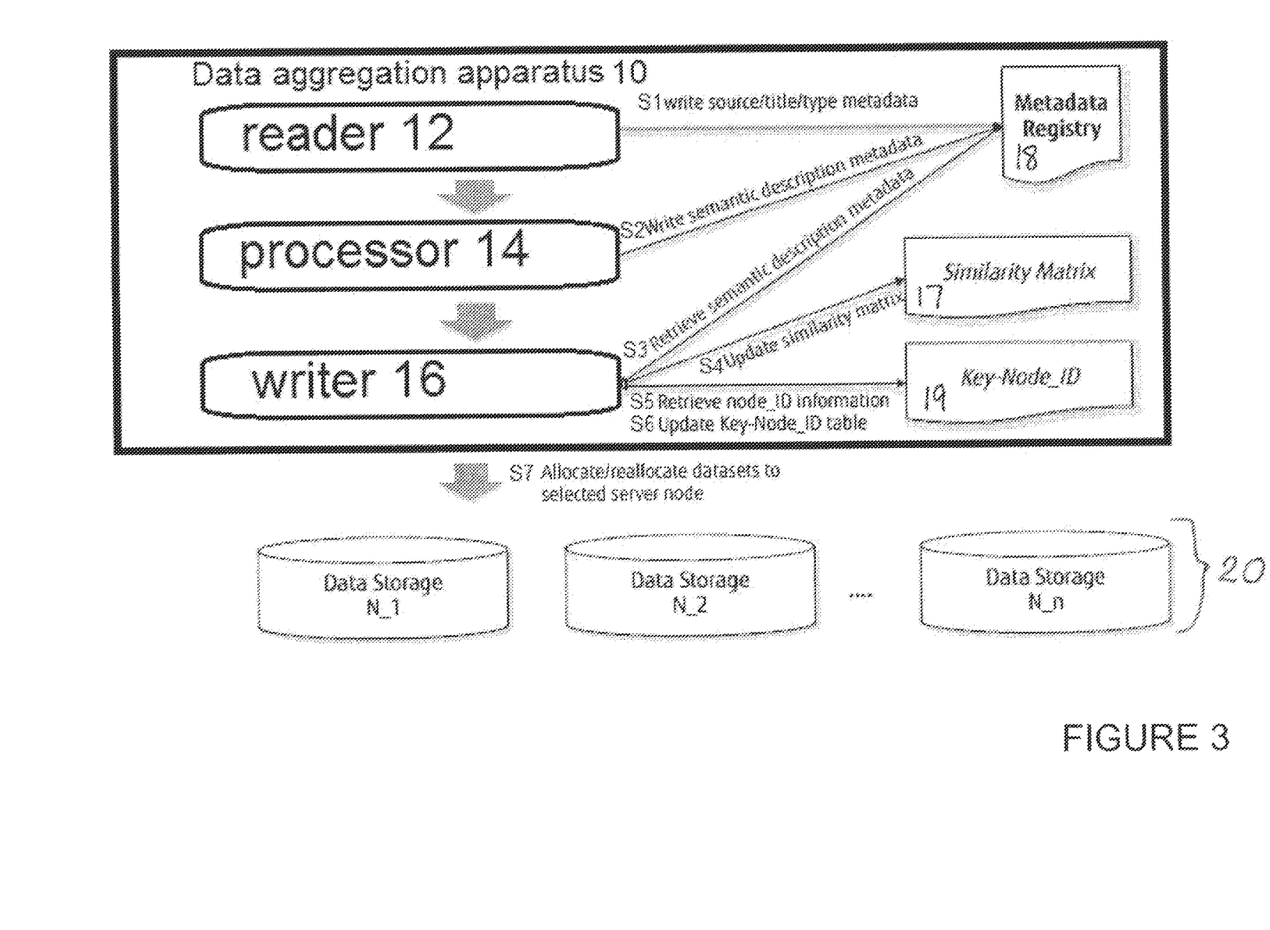
FIG. 3 is a representation of the system architecture which further explains the interaction between similarity matrix and Key_Node-ID table.
Figure 4:
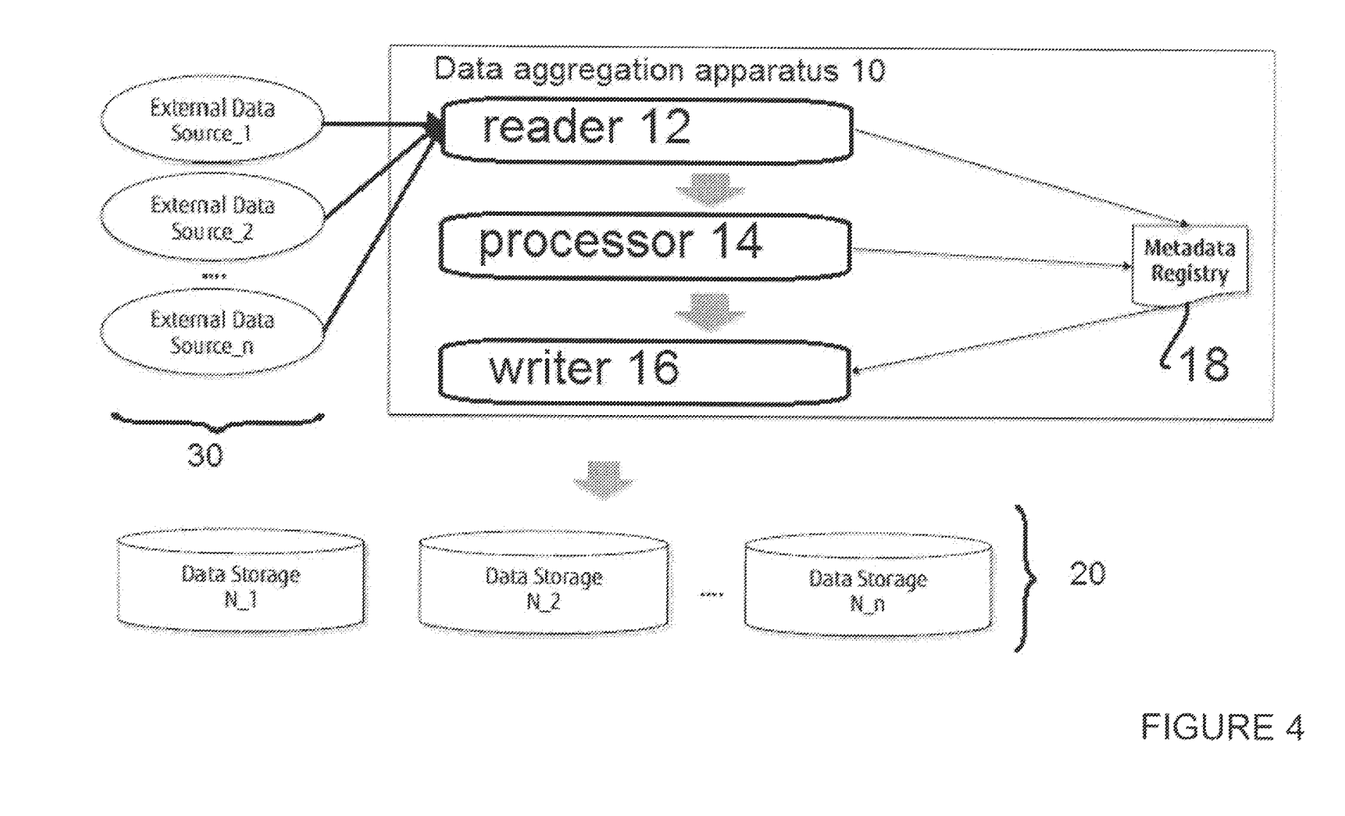
FIG. 4 illustrates how a process embodying the present invention may be performed by an apparatus embodying the present invention.

FIG. 3 is a representation of the system architecture which further explains the interaction between similarity matrix and Key_Node-ID table. FIG. 3 emphasises that the data storage 20 is provided by a plurality of data storage units. For example, each data storage unit may be a separate hard disk, storage node, or server. FIG. 4 also emphasises the interaction of the reader 12 with external data sources 30. The arrows between the external data sources 30 and the reader 12 represent data being read from the external data sources 30 by the reader 12.

The data aggregation apparatus 10 is exemplary of an apparatus for distributing data items among a plurality of data storage units mentioned elsewhere in this document.

The reader 12 is configured to establish a connection between the data aggregation apparatus 10 and a plurality of external data sources (EDS) 30. The reader 12 is configured to retrieve data from a data source and, if necessary, convert the data to a system parse-able document format. The reader 12 may extract metadata from the data source and attribute the data source an identifier (the attribution of an identifier to a data source may alternatively be performed by the processor 14). At step S1, the extracted metadata, which may include, for example, one or more of source URL, tile, and data type, and possibly also the identifier, are written to the metadata registry 18 by the reader 12.

The processor 14 is exemplary of the description generating module mentioned elsewhere in this document. The processor 14 is configured to convert the data read from the external data sources into the data format in which data items are stored in the data storage 20, for example, to convert data from an external data source into RDF triples. In addition, the processor is configured generate a semantic description of the external data sources. The data conversion and generating semantic description may be performed in parallel. At step S2, the semantic description (SD) of each data source is written to the metadata registry 18 in association with the identifier of the described data source.

The writer 16 is exemplary of the similarity calculation module and the allocator module mentioned elsewhere in this document. At step S3, the writer 16 is configured to retrieve semantic descriptions from the metadata registry 18 and to calculate, for each pair of data sources from among the plurality of data sources, a degree of similarity between the semantic descriptions of the pair of data sources. For example, it may be that data from a new external data source has been read by the reader 12 and processed by the processor 14. A record/table/matrix of degrees of similarity between data sources already having data items in the database, stored in the metadata registry 18, or as a separate record, is then updated by the writer 16 at step S4. The metadata registry 18, similarity matrix 17, and Key-Node ID 19 of FIG. 3 may all be stored on a single storage component.

The degree of similarity between the new data source and each external data source is calculated and recorded. The writer then allocates data items from a data source, such as a new data source, to data storage units among the data storage 20 in dependence upon the calculated degrees of similarity. In order to do so, at step S5, node_ID information is retrieved by the writer 16 from the Key-Node_ID table 19, in order to identify which nodes (storage units) are storing data items from the data source deemed most similar to the data source of the data items being allocated. In addition, at step S6, the writer may update the Key-Node_ID table 19 when the new data items have been allocated. Thus, the Key-Node_ID table 19 remains an up to date record of, for each data source, the identity of the or each data storage unit storing one or more data items from the data source and an indication of the proportion of the data items from the data source stored on the or each identified data storage unit. The record may be a key-node_ID table 19 wherein the node id is the identifier of the data storage unit and the key is the identifier of the data source of the data item. In such a table, there may be an entry per data item, an entry per data source, or an entry per data storage unit storing data from each node. The writer 16 may be configured to allocate data items from new data sources, and to reallocate data items for optimisation, each of these processes are represented by step S7 in FIG. 3.

The metadata registry 18 maintains information about the external data sources and is accessible by the components of the data aggregation apparatus 10. Table 1 illustrates sample data that may be stored in the metadata registry. The semantic descriptions are omitted for illustration purposes.

TABLE 1

Sample metadata registry 18, the columns illustrate information which may be retained about external data sources

| ID | Source URL | Title | Type | Semantic Description |
|---|---|---|---|---|
| EDS$_1$ | File://mydatabase/example | Financial | RDBMS | |
| EDS$_2$ | File:///mypath/mydocument | . . . | Word | |
| EDS$_3$ | http://dbpedia.org | dbpedia | Web Data | |
| . . . | | . . . | | . . . |
| EDS$_{new}$ | | Finance Stock Exchange | | |

In table 1, ID is an identifier generated by the metadata registry 18 or some other component of the data aggregation apparatus 10 for each external data source, unique among the plurality of external data sources. For example, this ID may be embedded into each of the RDF triples from the data source to indicate which external data source these RDF triples belong to. It may also be used for data reallocation in data allocation/reallocation processes. Source URL represents the absolute path of an external data source. It may be a file system, a website, a database path, or some other locator. Title is the name of the external data source, it may be a file name if it is a document, or a short name that represents a website. Type indicates the type of the external data source, e.g. a RDBMS database, a file or a web resource. Semantic Description is a semantic summary of the external data source, and may be in the form of a series of weighted terms. The values of source URL, title, and type may be extracted from the external data source directly by the reader 12 when the external data source is retrieved. Semantic description may be generated by the processor 14 in parallel with the data conversion from external data source type, e.g. RDBMS/document/web data to a unified data type, for example RDF.

As one implementation option, it may be that the semantic description of each data source comprises the same terms, with each term in each semantic description being associated with a weighting or some other form of quantitative indication of the frequency of appearance of the term in the data source to which the semantic description relates (for example, the frequency may be a tf-idf with the idf representing all of the data sources collectively). For example, it may be that existing semantic descriptions are updated to include new terms when a new semantic description is generated. Furthermore, the weightings or quantitative indications of existing semantic descriptions may be updated in response to a new semantic description being generated.

An exemplary semantic description of a data source is a list of weighted terms that are extracted/read from the data source, and which offers a semantic summary of the external data source. Text summarisation technologies are available which may be employed/utilised in generating a semantic description of a data source. For illustrative purposes in this example, a term-frequency (TF) method is applied (term-frequency is a numerical statistic which reflects how important a word or phrase is to a document in a collection or corpus, and is exemplary of an information retrieval technique). TF-based data summarisation comprises extracting a list of weighted terms from every data source to form the semantic description of the data source. A basic exemplary algorithm, for example, uses the raw frequency of a term in a document (data source) to assess how significant each term is, before identifying which are the most significant terms in a document and extracting them as the semantic description, possibly along with a value indicating their relative significance. The raw frequency is the number of times that term t occurs in document d. Before counting the term frequency, the data read from the external data source may be subjected to preprocessing by the description generating module. Preprocessing may include Natural language processing (NLP) techniques, including one or more of tokenisation, stemming, stop words removal, etc. Here, stemming refers to reducing the words for example "fishing", "fished", "fish" to the root word "fish". Stop words removal filters out less meaningful words like "a", "the", "of" etc. Stop words may be identified by reference to a stop word list, which may be stored on the data aggregation apparatus 10, or stored remotely and made accessible to the description generating module.

Before the description generating module is able to generate semantic descriptions (which may also be referred to as semantic summaries) of data sources, a list of stop words may be defined. Stop words are words that are used at a higher frequency than other words, and hence are less meaningful and impart little or no meaning if selected as terms in a semantic description, for example, a, and, are, as, the, of, will, etc. Stop word definition can be performed manually, otherwise, a pre-scan of the external data source may be performed to find out the collection frequency—the total number of times each term appears in the document—then the most frequent terms that are irrelevant to the domain of the document are taken as stop words. Alternatively, a general list of stop words may be obtained from an external source. After the stop words list is ready, the external data is ready to be further processed to find out the weighted terms to form the semantic description. For example, the terms having the highest appearance frequency in the data source excluding stop words may be included in the semantic description.

Depending on the implementation details, it may be that external data sources are categorised into the following types and processed differently by the description generating module:

type1: Text document/Web based text
type2: tabular form, e.g. RDBMS/Excel

For type1 data, the document may be analysed by identifying a number of terms that frequently appear in the document (and which are not stop words). These terms are essentially the keywords from the document, and hence are included in the semantic description.

For type2 data, the generation of the semantic description of the data source may be performed after the data are converted into RDF triples and before they are written into the data storage 20. For example, the converted RDF triples that encode the previously-tabular data, can be temporarily written into turtle files, then the term-frequency process can be proceeded in the same way as for type1 document data. These turtle files may be retained or deleted after the RDF triples are stored inside the RDF store. The turtle files are exemplary of a document or other text-based entity representing data from a tabular format in a form which allows term-frequency analysis to be performed.

The above semantic description generation processing may be executed in parallel with a conversion process if data from an external data source requires conversion into a different data source than that of the external data sources for inclusion in the aggregated database. e.g. data from an external data source may be reformatted as RDF triples by the process 14. Performing description generation and reformatting in parallel reduces performance overheads—for example, data can be read once and converted to RDF triple format at the same time as the same read data is analysed for term-frequency purposes. Each of the generated semantic descriptions are stored, for example, in a metadata registry 18.

The semantic description generating module may use text summarisation tools other than those which are term-frequency based. Furthermore, other standard NLP pre-processes, e.g. tokenization and stemming and additional processes can be performed automatically by such tools.

Furthermore, latent semantic analysis may be performed to generate or modify the numerical scores or weightings associated with the most significant terms included in a semantic description.

Latent semantic analysis is a technique for quantifying the importance of terms in a collection of documents, in this case the collection of documents is the collective data sources from which the data items originate. Latent semantic analysis improves the accuracy of the weightings applied to the terms so that similar terms (for example, polynyms or synonyms) are identified and the importance of the similar terms as a group is taken into account in the weighting. For example, latent semantic analysis may include assembling a matrix of terms and the data sources in which they appear, populating the matrix with tf-idf weightings (for the frequency of usage of the term in the data source relative to the frequency of usage of the term in the document corpus as a whole or the textual description as a whole), and applying rank lowering to the matrix to find a low rank approximation.

Optionally, generating the semantic description of a data source may include finding the synonyms of each of the most significant terms and including the synonyms in the semantic description.

Including the synonyms for each term in the semantic description provides another degree of generalisation, which helps to lessen the influence of local naming conventions and reduce the domain or ontology specificity of the semantic description.

Finding the synonyms may include querying a thesaurus or dictionary (possibly via an application programming interface) stored locally or remotely, with each term in the semantic description as an argument in a query and specifying that the query should be responded to with synonyms, and adding any results not already in the semantic description to the semantic description.

When comparing a pair of semantic descriptions, the amount which the degree of similarity being calculated increases when a term is found to be common between the pair of semantic descriptions may be proportional to the product of the respective weightings (the numerical value representing the significance of the term in the semantic description) associated with the term in the respective semantic descriptions. It may be that the semantic descriptions are extended to include synonyms and/or polynyms of the terms, so that the degree of similarity is increased when both semantic descriptions contain one from a list including a term and one or more synonyms or polynyms of the term.

The calculation of degrees of similarity between pairs of data sources, or similarity scoring, performed by the similarity calculation module, produces scores/values which may be utilised in storing data items from external data sources that are semantically similar on data storage units (server nodes) in such an order (or in such locations) that they tend to be co-located on the same data storage units. Storing data items from semantically similar data sources on the same data storage units reduces the number of data storage unit accesses (disk accesses) required to generate a response to a query such as a range query. For example, Wikipedia and DBpedia are both knowledge bases, if a user or application is looking for knowledge in Wikipedia, it is also very likely that DBpedia will be searched. Similarly, if a data source contains finance balance sheets it is likely to be accessed in a query which also accesses finance stock exchange information.

To calculate the degree of similarity among different external data sources, a measure such as the standard cosine similarity measure may be used. Cosine similarity is a way of measuring the degree (amount/level) of similarity between two vectors of an inner product space that measures the cosine of the angle between them. As applied to calculating the degree of similarity between two data sources, or more specifically to calculating the degree of similarity between the generated semantic descriptions of two data sources, it is a mathematical way of calculating the (degree of) similarity between the two semantic descriptions. The range of the cosine similarity value, which is the degree of similarity), for two data sources is from 0 to 1, since the term frequencies (which may be given by tf-idf weights) cannot be negative. Given two external data sources EDSi and EDSnew, the semantic description similarity is defined by cosine similarity between two pairs of semantic descriptions, shown as follows:

$$\text{similarity}(SD_i, SD_{new}) = \cos(S_{SD_i}, S_{SD_{new}}) = \frac{S_{SD_i}, S_{SD_{new}}}{|S_{SD_i}||S_{SD_{new}}|}$$

The calculated similarity scores between every pair of semantic descriptions is recorded, for example, stored in a similarity matrix 17 as shown below.

The processes of generating a semantic description of a data source and calculating the degrees of similarity between the data source and other data sources may be triggered every time when data from a new data source is entered into the aggregated database.

In the following illustrative example, we assume the initial data storage is empty, that is to say, there is no degree of similarity calculation initially in the data aggregation system when data items from the first data source are added. The first data source is referred to as EDS1, and its semantic description is generated and recorded, and is referred to as SD1. When the second external resource EDS2 is read and the semantic description thereof generated, the degree of similarity calculation starts that compares SD1 with SD2, and writes the similarity result into a similarity matrix 17. The next time a new data source EDS3 is read, a semantic description of the new data source is generated, and the degree of similarity between the new data source EDS3 and each of the existing data sources EDS1 and EDS2 calculated. Consequently, the similarity matrix 17 is incrementally expanded. An exemplary similarity matrix 17 is shown in table 2: the matrix is symmetric with the value in diagonal cells equal to 1.

TABLE 1

Semantic description similarity matrix 17

|  | SD1 | SD2 | SD3 | . . . | SDnew |
| --- | --- | --- | --- | --- | --- |
| SD1 | 1 | 0.6 | 0.4 | . . . | 0.7 |
| SD2 | 0.6 | 1 | 0.5 | . . . | 0.3 |

TABLE 1-continued

Semantic description similarity matrix 17

|  | SD1 | SD2 | SD3 | ... | SDnew |
|---|---|---|---|---|---|
| SD3 | 0.4 | 0.5 | 1 | ... | 0.4 |
| ... | ... | ... | ... | ... | ... |
| ... | | | | 1 | |
| SDnew | 0.7 | 0.3 | 0.4 | ... | 1 |

In the architecture of FIG. 2, the similarity calculations are performed by the writer 16 as a pre-process for data allocation, also performed by the writer. The results of the similarity calculations are stored in the metadata registry 18, for example, as a similarity matrix 17 such as table 2.

In summary, an external data source is read and, if necessary, its data converted into the unified data format of the aggregated database. Whilst converting the data, or otherwise, the data of the external data source are scanned and optionally data alignment with existing data is performed. While scanning, a semantic description of the data is generated, for example, by performing a simple term frequency (TF) based summarisation. Further processing such as normalising the weightings attributed to terms in the generated semantic descriptions may be performed.

Based on the calculated degrees of similarity, data items from a new external data source EDSnew can be allocated to a selected data storage unit (by specifying the identifier, or Node_ID) by an allocator module or writer 16. Allocating data items from EDSnew to a data storage unit in dependence upon the degree of similarity between EDSnew and existing data sources EDSi enables data items from semantically similar data sources to be co-located. Based on the operational assumption that semantically similar data sets (as well as the data items in the data sets) are more likely to be leveraged together in database operations, performance benefits results from minimising cross-data storage unit operations.

A mapping table may be maintained as a record of, for each data source, the identity of the or each data storage unit storing one or more data items from the data source and an indication of the proportion of the data items from the data source stored on the or each identified data storage unit. The indication of the proportion of the data items may be absolute or relative, so that even if the value of the proportion cannot be derived from the record, the data storage units can be ranked in order from that storing the most data items from a particular data source to that storing the least. A key-node_ID mapping table 19 is exemplary of such a record. In order to find the server Node_ID of a particular EDSi, a Key-Node_ID mapping table 19 may be maintained by the writer 16.

A hashtable may be used to implement the Key-Node_ID mapping table 19. The function served by the Key-Node_ID mapping table 19 is to maintain a record of the location information (in terms of data storage unit identifiers) of data items from each of the plurality of data sources. Every time data items from a EDS are allocated, or data items from any of the existing EDS are reallocated, this table will be updated accordingly to reflect these changes. An example of the hashtable is shown in table 3:

TABLE 2

Key-Node_ID table 19

| Key | Node_ID List |
|---|---|
| EDS1 | [N1, N3...] |
| EDS2 | [N1, N5...] |
| EDS 3 | [N2, N7...] |
| ... | ... |
| EDSnew | |

In the above table, the key is data source identifier (ID); which is the same key that is used in the metadata registry, and the node_ID list is a list of the identifiers of data storage units that store data items from each identified data source. In this particular example, the node ids (data storage unit identifiers) are stored in order of proportion of data items from the data source stored. The first Node_ID is the server node that has the highest proportion of data items from EDSi is stored, and so on. Server Node_ID may be provided by the data locality mechanism such as the writer 16, normally through a hash function mapping data/data segment ID to a storage/server node.

If EDS2 is deemed the most similar external data source with respect to a new external data source EDSnew, the corresponding Node_ID will be retrieved from the hashtable as a potential allocation target for the data items from EDSnew. Several distinct situations which may arise, and possible rules for handling them, are presented below:

The server node where majority of EDS2 is stored (in this case N1) will be selected as the preferred data storage unit to which to allocate one or a group of data items from EDS new The writer thus prioritises N1 when storing data items from EDSnew If size (EDS new)>available_capacity (N1), that is to say, if the data items from EDSnew are to be stored together (this is an implementation option), but there is not sufficient storage space on N1:

The server node holding the largest proportion of the remainder of EDS2 will be considered, when applicable.

The next most similar data source will be chosen and the above process repeats (i.e. the data items from the data source are allocated to the data storage unit storing the most data items from the most similar data source which (data storage unit) has sufficient storage space for the data items)

Hence, in selecting a data storage unit to which to allocate data items from a data source, the allocator module first finds the most similar data source and proceeds to the next most similar data source until the data items have all been allocated. When data items from a data source occupy more than one data storage unit, a decreasing order of proportion of data items from that data source stored thereon will determine the order in which data storage units are considered as allocation targets. It may be that the data items being allocated are a group which cannot be split, in which case the first data storage unit considered as a data allocation target which has sufficient space for the entire group will be allocated the entire group. Alternatively, it may be that the group can be split, and hence the data items are allocated to the allocation targets until each has no further available storage space, and then the next allocation target s filled.

The allocator module, which may be functionality provided by the writer 16 of FIG. 2 or by some other component, may select data storage units to which to allocate data items by using the degrees of similarity between data sources having data items stored thereon and the data source of the data items to be allocated to discriminate between data storage units. The allocator module may select data storage units as allocation targets in an order determined by the degrees of similarity between data sources having data items stored thereon and the data source of the data items to be allocated to discriminate between data storage units. Once an allocation target has been selected, data items to be allocated will be allocated thereto if there is sufficient space to store some or all of the data items to be allocated (in dependence upon whether the data items to be allocated are to be stored on a single data storage unit or can be divided), before the next allocation target is considered. For example, when the allocator module tries to select a target server to write data items from EDS new, it firstly examines the similarity matrix 17 by looking at the column that has the similarity comparison among SDnew and the remaining data sources (or their semantic descriptions) to find out the EDSi that has the highest similarity weight, for example:

TABLE 3

Column extracted from similarity matrix 17 containing calculated degrees of similarity to SDnew

|  | SDnew |
| --- | --- |
| SD1 | 0.7 |
| SD2 | 0.3 |
| SD3 | 0.4 |
| ... | ... |
| SDnew | 1 |

A sorting might be forced on the similarity list for convenience. Ties may be broken by prioritising datasets which are less distributed. For example, a data set whose segments spread across M server nodes will be considered ranking lower comparing with a dataset spreading across K server nodes (where M>K).

In the specific example illustrated in Table 4, SD1 has the closest semantic description to that of SDnew, e.g.: similarity(SD1, SDnew)=0.7.

The writer 16 then searches for the Node_ID information of EDS1 from the Key-Node_ID table, and allocates data items from EDSnew to the same node where EDS1 is located, in this case N1.

In a situation in which the allocation target cannot accommodate the data items from EDS new, or cannot accommodate all of the data items from EDSnew, it may be necessary to select a next allocation target.

It may be that the writer 16 is configured to reallocate existing data items in order to create storage space for data items being allocated. For example, if a data storage unit selected as an allocation target stores data items from two data sources, and the degree of similarity between the two data sources is less than the degree of similarity between one of the data sources and the data source of the data items to be allocated, then the data items from the one of the two data sources having the lowest degree of similarity to the data source of the data items to be allocated are removed from the data storage unit and allocated elsewhere (for example, by the writer, after the present allocation).

Illustrating the reallocation procedure by continuing the above example, note from table 3 that the data items from both EDS1 and EDS2 are primarily located on N1. If N1 has not enough space to locate the data items from EDSnew, the writer 16 checks which other EDSi are located on the same data storage unit, and finds EDS2. It further traces back to the similarity matrix 17 for similarity between EDS1 and EDS2:
similarity(SD1, SD2)=0.5

In this case, similarity(SD1, SDnew)>similarity(SD1, SD2), therefore, EDS2 is to be reallocated to its next closest external data source. Using the same similarity matrix 17, the writer 16 discovers that similarity(SD2, SD3)=0.5, is the next option, therefore, EDS2 will be reallocated to N2. This reallocation is accomplished by copying all the RDF triples that share the same external data source ID (as shown in the metadata registry the Key value) to N2, and then deleting the original dataset from N1.

Alternatively, if similarity(SD1, SDnew)<similarity(SD1, SD2), then the data items from EDSnew will be allocated to the next Node_ID where the next closest external data source located, e.g., N2 where SD3 is located.

Once the locations have been decided, the Key-Node_ID table is updated accordingly.

The invention claimed is:

1. A data storage system comprising: a plurality of data storage units; and
a computer comprising a processor, the processor being configured to perform a method for distributing data items among the plurality of data storage units, the data items being an aggregation of data from a plurality of data sources, the method comprising:
generating a semantic description of each of the plurality of data sources;
calculating, for each pair of data sources from among the plurality of data sources, a degree of similarity between semantic descriptions of the pair of data sources; and
allocating data items to data storage units from of the plurality of data storage units in dependence upon the degree of similarity between the data source of a data item being allocated and the data source of data items already allocated to the data storage units; and
maintaining, for each data source, a record of the identity of each data storage unit storing one or more data items from the data source and an indication of the proportion of the data items from the data source stored on each identified data storage unit;
wherein allocating data items to data storage units in dependence upon the calculated degree of similarity includes allocating a group of data items from the same data source to the data storage unit indicated by the record as storing the largest proportion of the data items from the data source having the highest degree of similarity to the data source of the group of data items to be allocated, and wherein the data storage unit has sufficient storage space for the group of data items.

2. The data storage system according to claim 1, wherein generating a semantic description of each of the data sources includes extracting most significant terms as a list of weighted terms from a data source which list of weighted terms is a generated semantic description.

3. The storage system according to claim 2, wherein the most significant terms among terms in the data source are identified by and a weight attributed to each of extracted most significant terms is calculated by a term-frequency method.

4. The storage system according to claim 3, wherein the degree of similarity is a value obtained by calculating a cosine similarity between generated semantic descriptions of the pair of data sources.

5. The data storage system according to claim 1, wherein the data items are stored in a unified data format, wherein the unified data format is an Resource Description Framework (RDF) triple format.

6. The data storage system according to claim 5, further comprising:
reading data from a data source and performing processing to prepare read data for storage as data items having the unified data format.

7. The data storage system according to claim 1, further comprising, if a data storage unit selected to receive data items being allocated already stores data items from two data sources, and the degree of similarity between the semantic descriptions of the two data sources is less than a higher of the degrees of similarity between the semantic descriptions of each of the data sources and the data source of the data items to be allocated, then the data items from the one of the two data sources having a lowest degree of similarity to the data source of the data items to be allocated are removed from the data storage unit and allocated elsewhere.

8. The data storage system according to claim 1, wherein the data items each include an identifier identifying a data source of the respective data item from among the plurality of data sources.

* * * * *